(12) United States Patent
Zhang et al.

(10) Patent No.: US 9,093,891 B2
(45) Date of Patent: Jul. 28, 2015

(54) SEALED TRANSMISSION DEVICE FOR HELIUM SPACE OF HIGH TEMPERATURE GAS COOLED REACTOR AND DRIVE DEVICE THEREOF

(75) Inventors: Haiquan Zhang, Beijing (CN); Hongke Li, Beijing (CN); Xin Wang, Beijing (CN); Jiguo Liu, Beijing (CN); Zongxin Wu, Beijing (CN); Zuoyi Zhang, Beijing (CN)

(73) Assignee: Tsinghua University, Beijing (CN)

( * ) Notice: Subject to any disclaimer, the term of this patent is extended or adjusted under 35 U.S.C. 154(b) by 399 days.

(21) Appl. No.: 13/574,881

(22) PCT Filed: Dec. 31, 2010

(86) PCT No.: PCT/CN2010/002243
§ 371 (c)(1),
(2), (4) Date: Aug. 7, 2012

(87) PCT Pub. No.: WO2011/091578
PCT Pub. Date: Aug. 4, 2011

(65) Prior Publication Data
US 2013/0057098 A1 Mar. 7, 2013

(30) Foreign Application Priority Data
Jan. 28, 2010 (CN) .......................... 2010 1 0103351

(51) Int. Cl.
*H02K 49/10* (2006.01)
*G21C 7/12* (2006.01)

(52) U.S. Cl.
CPC ............ *H02K 49/108* (2013.01); *H02K 49/104* (2013.01); *H02K 49/106* (2013.01); *G21C 7/12* (2013.01)

(58) Field of Classification Search
CPC .................................................... H02K 49/104

USPC .............................. 310/103; 464/29; 376/228
See application file for complete search history.

(56) References Cited

U.S. PATENT DOCUMENTS

| | | | | |
|---|---|---|---|---|
| 2,556,854 A | * | 6/1951 | Spears et al. | 310/104 |
| 5,017,102 A | * | 5/1991 | Shimaguchi et al. | 417/420 |
| 5,089,211 A | * | 2/1992 | Dillmann | 376/232 |
| 5,108,715 A | * | 4/1992 | Jekat et al. | 422/159 |
| 5,517,536 A | * | 5/1996 | Goldberg et al. | 376/232 |
| 5,793,826 A | * | 8/1998 | Sato et al. | 376/228 |

FOREIGN PATENT DOCUMENTS

| CN | 2563354 | 7/2003 |
|---|---|---|
| CN | 1176469 C | 11/2004 |

(Continued)

*Primary Examiner* — Burton Mullins
(74) *Attorney, Agent, or Firm* — Morriss O'Bryant Compagni, PC

(57) ABSTRACT

A sealed transmission device for a helium space of a high temperature gas cooled reactor and a drive device thereof are disclosed. The helium space (1) is enclosed by a chamber body (2), a pressure-bearing casing (3), a fastener (4) and a sealing element (5). A transmission member (8) is connected with an executing member (6) inside the helium space (1) and a motive member (7) outside the helium space (1) and transmits movements between them. The transmission member (8) is a magnetic shaft coupling which includes the pressure-bearing casing (3), a driving magnetic component (9) arranged outside the pressure-bearing casing (3) and a driven magnetic component (10) arranged inside the pressure-bearing casing (3). The motive member (7) and the driving magnetic component (9) are connected to each other to form a driving member, and the executing member (6) and the driven magnetic component (10) are connected to each other to form a driven member. The present invention can seal the thermal state radioactive helium space fully, and satisfy controllability and reliability requirements for the operations, such as big torque, long time and continuity, reciprocating rotation and frequent start and stop, etc.

22 Claims, 2 Drawing Sheets

(56) References Cited

FOREIGN PATENT DOCUMENTS

| CN | 1645521 | | | 7/2005 | |
| --- | --- | --- | --- | --- | --- |
| CN | 101109390 | A | | 1/2008 | |
| CN | 101159172 | A | | 4/2008 | |
| CN | 101800464 | | | 8/2010 | |
| GB | 954718 | A | * | 4/1964 | ............... G21C 3/04 |
| JP | 09074777 | | | 3/1997 | |

* cited by examiner

SEALED TRANSMISSION DEVICE FOR HELIUM SPACE OF HIGH TEMPERATURE GAS COOLED REACTOR AND DRIVE DEVICE THEREOF

CROSS-REFERENCE TO RELATED APPLICATIONS

This application is a national phase entry under 35 U.S.C. §371 of PCT/CN2010/002243 filed on Dec. 31, 2010, which claims priority to Chinese Patent Application No. 201010103351.7 filed on Jan. 28, 2010, the entirety of each of which is incorporated by this reference.

TECHNICAL FIELD

The present invention relates to the field of sealed transmission reactors, particularly to a sealed transmission device for a helium space of high temperature gas cooled reactor and a drive device thereof.

BACKGROUND ART

A high temperature gas cooled reactor is a high temperature reactor in which graphite serves as a moderator and helium serves as a coolant, and is an advanced nuclear reactor with a good inherent safety, high electricity generating efficiency and a very wide range of application fields. The graphite dust produced by the graphite materials or fuel elements located inside the high temperature gas cooled reactor due to abrasion is radioactive. These tiny graphite dust mainly disperse in a circuit helium space in the form of aerosol. It is well known that the helium has a strong permeability in comparison with other mediums, thus one of the important applications thereof in the industrial field is seal leak detection. The pressurized helium flowing through the core of a reactor carries radioactive graphite dust. As a result, the helium also has a certain amount of radioactivity; therefore, it is necessary to take strict sealing measures for the pressure boundary and auxiliary system pipelines of a high temperature gas cooled reactor. If external leakage occurs in the equipment and pipeline attachments of these systems, not only are the normal operation and safe shutdown of the reactor affected, but the safety of operators and the environment are endangered. On the other hand, if a leak occurs, it will also result in economic waste because the price of helium itself is expensive.

In order to avoid a helium leak, the connection of equipment, valves, pipelines and pipe fittings in a high temperature gas cooled reactor mainly use a welded structure, or a sealing structure with edge-sealing welding. For example, all the helium valves in a HTR-10 experimental reactor adopt a structure by using a corrugated pipe with filler sealing between the valve cap and the valve rod. In spite of this, a large number of pressure-bearing mechanical devices that includes moving parts are located in the pipelines of a circuit pressure boundary and reactor auxiliary system, requires using methods such as power-driven or electromagnetism, etc. for remote operation, and the driving mechanism thereof must ensure reliable operation under the environment of on-site irradiation, temperature and humidity. For these pressure-bearing mechanical devices, if a filler or packing seal is adopted, it is difficult to radically solve the problem of a helium seal because a seal surface exists. Because of the inherent flexibility of the corrugated pipe, it has little rigidity, is liable to be unstable, unable to reverse at large angles and limited in fatigue life, which is difficult to meet the technical requirements for the operations such as large torque, continuous operation for a long time, reciprocating rotation and frequent start and stop, etc. by means of a corrugated pipe for sealing.

In order to solve the problem of reliable sealing to the radioactive helium by pressure boundary operation mechanical devices, high temperature gas cooled reactors that have been built or under construction mainly adopt an inclusion structure with a motor-driven or electromagnetism driving mechanism inside the pressure-bearing casing, such as the non-active safety drive device applied in the absorber ball shutdown system of a high temperature gas cooled reactor as disclosed in the description of Chinese patent publication No. CN 101159172A, and a centrifugal helium compression of a pebble-bed high temperature gas cooled reactor as disclosed in CN 101109390A. If the inclusion structure is adopted, the mechanical dynamic seal of operational components is transformed into a static seal of electrical penetration assemblies. Although the problem of helium leakage is solved by this way, a series of technical problems about the harsh environment inside the pressure-bearing casing and the reliable operation requirements such as the issues of anti-radiation, temperature tolerance, pressure-bearing, lubrication and abrasion, operation for a long period of time, etc. with respect to the driving motor and the transmission member also must be solved. Therefore, the driving motor and the transmission member must adopt non-standard designs and be subjected to engineering tests. On the other hand, the electrical penetration assemblies in the nuclear plant are generally customized with respect to specific types of reactors and special pressure boundary safety and equipment (e.g. patent publication No. CN1176469C). The cost of electrical penetration assembly customization or the pressure-bearing mechanical equipments research based on different structures and operational environments is quite high, which is unacceptable for the non-safety level pressure-bearing mechanical equipment of the auxiliary system. Thus generally it only adopts electric connectors with low reliability. This kind of normal electric connectors and its connecting parts for connecting with the pressure-bearing casing may therefore become a weak link of the pressure-bearing mechanical equipment.

SUMMARY OF THE INVENTION

1. Technical Problems to be Solved

The technical problem to be solved by the present invention is making improvements on the prior art to realize a complete seal to the thermal state radioactive helium space, and to reach the requirements of controllable and reliable usage for the operations such as large torque, continuous operation for a long time, reciprocating rotation, frequent start and stop, etc.

Another technical problem to be solved by the present invention is providing a new drive device used for sealed transmission of a helium space. Each equipment component of such a drive device has a compact structure, safe and reliable operation, and is easy for replacement and maintenance.

2. Technical Solution

In order to solve the first technical problem above, the present invention provides a sealed transmission device for a helium space of a high temperature gas cooled reactor, the helium space is enclosed by a chamber body, a pressure-bearing casing, a fastener and a sealing element. A transmission member is connecting an executing member inside the helium space with a motive member outside the helium space and transmits movements between them. The transmission member is a magnetic shaft coupling which includes the pressure-bearing casing, a driving magnetic component located outside the pressure-bearing casing and a driven magnetic component located inside the pressure-bearing casing. The motive member and the driving magnetic component are connected to each other to form a driving member. The executing member and the driven magnetic component are connected to each other to form a driven member.

Preferably, the connection between the motive member and the driving magnetic component is a static connection. The static connection is a detachable connection in any form.

Preferably, the connection between the executing member and the driven magnetic component is a static connection. The static connection is a detachable connection in any form.

Preferably, the connection between the executing member and the driven magnetic component is a dynamic connection. The dynamic connection is a spiral or ball screw guide mechanism or a motion transformation mechanism in other forms.

Preferably, the motive member is driven by a driving motor which is a conventional motor, a variable frequency motor, a stepping motor or a servo motor. The motive member drives the driven member to realize a sealed transmission at different rates or torques.

Preferably, a motion sensor is provided on the shafting of the driving member, to carry out a half-feedback based movement control for the executing member.

In order to solve the second technical problem above, the present invention provides a drive device for a sealed transmission of a helium space. The drive device includes a motive member, an executing member and a transmission member. The transmission member is a magnetic shaft coupling which includes a pressure-bearing casing, a driving magnetic component located outside the pressure-bearing casing and a driven magnetic component located inside the pressure-bearing casing. The pressure-bearing casing connects to and supports the driving magnetic component and the driven magnetic component respectively by a first bearing pair and a second bearing pair. The pressure-bearing casing is connected to the chamber body.

Preferably, the magnetic shaft coupling is in a disc-type structure, the driving magnetic component and the driven magnetic component are in plane shaped structures.

Preferably, the magnetic shaft coupling is in a cylinder-type structure, the driving magnetic component and the driven magnetic component are in sleeve shaped magnetic ring structures.

Preferably, the pressure-bearing casing has a flange at the opening end, a sealing spacer is provided between the flange and an end face of the chamber body.

Preferably, the pressure-bearing casing has a flange at the opening end, an O-shape metal ring is provided between the flange and an end face of the chamber body.

Preferably, sleeve flanges are provided outside the pressure-bearing casing, and connected to the chamber body by bolt connection fasteners.

Preferably, a sleeve support is provided outside the pressure-bearing casing, the end face of the sleeve support is designed as a support for the shafting of the motive member.

Preferably, a heat dissipation structure is provided outside a cylindrical shell of the pressure-bearing casing.

Preferably, a dustproof plate is located inside the cylindrical shell of the pressure-bearing casing, and a metal dust screen is located on a driven shaft.

Preferably, a thick-walled, metal shielding ring is located inside the opening end of the cylindrical shell of the pressure-bearing casing. A thickened shielding step is located at the closed end of the pressure-bearing casing.

Preferably, the first bearing pair and the second bearing pair are made of wear-resistant alloys.

Preferably, the ball tracks of the bearing pairs are made of solid lubricant films by plasma spray, and the ball is made of ceramics.

Preferably, the pressure-bearing casing is made of titanium alloy.

3. Beneficial Effects

Since the pressure-bearing casing, the driving magnetic component and the driven magnetic component of the magnetic shaft coupling are all rigid bodies, it solves the problems involved in the sealing of corrugated pipes such as small rigidity, instability, unable to be twisted at large angles, limited fatigue life, etc., and can meet the technical requirements for the operations such as large torque, continuous operation for a long time, reciprocating rotation, frequent start and stop, etc. The motive member that is located outside the pressure-bearing casing and operating under compartment standard environment can adopt existing products and standard components. The connection between the driving magnetic component and the motive member, as well as the connection between the executing member in the driven member and the driven magnetic component are all static connections. Furthermore, the separability feature of the magnetic shaft coupling can simplify the complicated mechanical transmission device, and the involved motion equipment components are easy for replacement, maintenance and quick disassembly to ensure the reliability of the whole system. Moreover, as there is no electrical component located inside the pressure-bearing casing, it avoids weak links in the connections which may be involved in the electric connectors, further ensuring reliability of the sealed drive method and equipment components thereof.

In the figures: 1: helium space; 2: chamber body; 3: pressure-bearing casing; 4: fastener; 5: sealing element; 6: executing member; 7: motive member; 8: transmission member; 9: driving magnetic component; 10: driven magnetic component; 11: power system; 12: decelerator; 13, 14: connections; 15: first bearing pair; 16: second bearing pair; 17: flange; 18: sleeve flange; 19: sleeve support; 20: bearing; 21: end face; 22: motion sensor; 23: heat sink; 24: dustproof plate; 25: metal dust screen; 26: metal shielding ring; 27: shielding step

DETAILED DESCRIPTION OF THE INVENTION

Hereinafter, the embodiments of the present invention will be described in further details in combination with figures and embodiments. The embodiments below are used for describing the present invention, but not for limiting the scope of the present invention.

Figure 1:
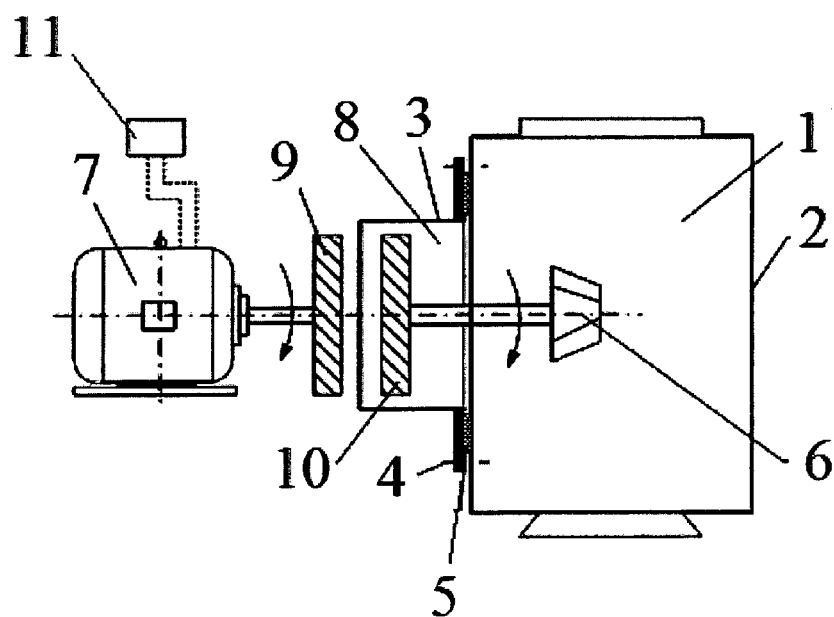
FIG. 1 is a structural schematic view of a sealed transmission device for helium space according to an embodiment of the present invention.

FIG. 1 illustrates a sealed transmission device for helium space of high temperature gas cooled reactor, the helium space 1 is composed of a pressure-bearing casing 3 and a chamber body 2. A motive member 7 that includes a driving motor and a driving shaft is located outside the helium space 1. An executing member 6 is located inside the helium space 1. A transmission member 8 is connecting the motive member 7 and the executing member 6. The transmission member 8 is a magnetic shaft coupling, and the pressure-bearing casing 3 is a constituent part of the magnetic shaft coupling. Besides pressure-bearing casing 3, such magnetic shaft coupling further includes a driving magnetic component 9 located outside the pressure-bearing casing 3 and a driven magnetic component 10 located inside the pressure-bearing casing 3. The magnetic circuits for the permanent magnets of driving magnetic component 9 and driven magnetic component 10 adopt a combining form with tight alignment. The motive member 7 and driving magnetic component 9 are connected to each other to form a driving member. The executing member 6 and driven magnetic component 10 are connected to each other to form a driven member.

The working principle of the transmission of a magnetic shaft coupling is as follows: a mechanical direct connection (such as a rigid shaft coupling, etc.) between the motive member and the executing member is omitted. Instead of this, various movements are conducted by the driving magnetic component on the magnetic coupling device and the driven magnetic component, which is separated from and coupled to the driving magnetic component. The driving and driven magnetic components, depending on a magnetic coupling, complete the soft transmission operation and the control of the system, through a flexible connection functioned by the magnetic field, to realize transmission of movement and force. The magnetic shaft coupling changes a hard transmission of direct connection type into a soft transmission of coupling type to realize a complete separation between the driving and driven devices and realize a static seal under dynamic state, to ensure a condition for zero leakage and enhance sensitivity, stability and reliability of transmission and control.

The procedure based on the transmission method of magnetic shaft coupling is as follows: a power system 11 controls the motive member 7 to work. Since the motive member 7 is connected to the driving magnetic component 9, and the driven magnetic component 10 is connected to the executing member 6. After the motive member 7 directly drives the driving magnetic component 9, the magnetic fields of the driving and driven magnetic components are coupled to each other via the wall layer of the pressure-bearing casing 3. When the driving magnetic component 9 moves, the driven magnetic component 10 starts moving due to the function of magnetic field, to drive and control the executing member 6 for operation; that is, by means of the function of magnetic coupling of transmission member 8 which closes the magnetic system of permanent magnets, the working states and parameters of the executing member 6 are decided by the motion state of the motive member 7, so as to complete the transformation of motion type or state which has been set. According to the motion requirements, the magnetic coupling transmission can have a constant speed or an adjustable and variable speed.

The motive member 7 is driven by a driving motor, and can realize the requirement for sealed transmissions of different speeds or torques when matched with decelerators of different specifications and parameters. As there are no relative motions, a synchronous rotation between the driving member and the driven member can be realized by the magnetic force generated between the driving and the driven magnetic components.

Preferably, the connection between the executing member 6 and driven magnetic component 10 adopts a dynamic connection such as a spiral connection or a ball-screw guide mechanism or a motion transformation mechanism in other forms. Because of the motion transformations between dynamic connections, when the driving magnetic component drives the driven magnetic component for rotation motion, the executing member can be driven to do a linear movement or to move along a specific motion curve. In such transmission method, through organically combining the magnetic circuit design for the driving and driven magnetic components of the magnetic shaft coupling with the mechanical design for the executing member satisfying the requirements of different motion curves, an entirety of the motion system is formed, which can conduct a more complicated motion curve, break through traditional mechanical linkage mechanism, and realize a good static seal under the dynamic state.

Preferably, a variable frequency motor, a stepping motor or a servo motor, etc. is adopted for controlling the drive of motors, so under the control of the power system, an electromagnetic force can be used to drive the driven member to realize automatic controls for speed change, reversing and start-stop of the sealed transmission. Alternatively, a motion sensor 22 such as a rotary encoder, a rotary transformer, etc. is located on the driving shafting, Through the cooperation of high precision controlling motor with detection signals of the sensor, a feedback movement control for the driven member can be conducted, and the precision controls for speed regulation, rotation, swing or motion transformation of the motion executing member can be further implemented.

The drive device for the helium space of the present invention includes a driving shafting, a driven shafting and a magnetic shaft coupling; the magnetic shaft coupling has a pressure-bearing casing 3, a driving magnetic component 9 located outside pressure-bearing casing 3 and a driven magnetic component 10 located inside pressure-bearing casing 3; the pressure-bearing casing 3 is connected to a chamber body 2 of a pressure-bearing equipment, the riving magnetic component 9 is connected to the driving shafting of the pressure-bearing equipment, and the driven magnetic component 10 is connected to the driven shafting of the motion executing member of the pressure-bearing equipment.

With respect to structure forms, the driving and driven magnetic components of the magnetic shaft coupling in the above-mentioned drive device can adopt a disc-type structure or a cylinder-type structure. The former has a flat structure, a large axial rigidity and rotary inertia, can transmit a high rotary speed and a large torque, which is suitable for a helium compressor requiring complete seal and having larger dynamic loads and high speed rotational moving members. The latter is assembled with a driving motor and a decelerator, and has a slender structure, the cylindrical shell of the pressure-bearing casing has a good guiding property, which is suitable for sealed transmission of various pressure-bearing mechanical equipments having a low rotary speed and stable operation with high motion controlling requirements, such as various drive devices for an unloading apparatus and transportation switching equipment.

The sealing position in the drive device of above-mentioned helium space is located at a match part between an end flange of the pressure-bearing casing and a working chamber. When the temperature inside the chamber is low, a soft sealing spacer can be used for sealing repeatedly. When the temperature of helium inside the chamber is higher than 180, an O-shape metal ring is used. The fastener 4 is used for realizing the seal of high temperature helium. By means of a standard flange plate located outside the pressure-bearing casing 3, the fastening of the end flange structure of the non-standard pressure-bearing casing to the sealing element can be strengthened and the loading condition for the fastener can be improved. Such flange plate, which is designed as a sleeve structure and located outside the driving magnetic component 9, can assist supporting the driving magnetic component 9 through bearings and be used for structural support and lifting of the magnetic shaft coupling; a support structure can be designed on the end face of the flange plate for supporting a support of the motive member shafting.

A dustproof plate 24 is located inside the pressure-bearing casing of the above-mentioned helium space drive device. The dustproof plate 24 can be used to stop and weaken the radiative transfer of heat inside the working chamber towards the driven magnetic component; on the other hand, the radiating fins outside the pressure-bearing casing 3 and their environmental air flow can take the heat out of the helium space, further improving the operational temperature environment of the internal and external bearings of the pressure-bearing casing 3, and ensuring the service life of the magnetic shaft coupling and other transmission members. Moreover, the dust proof plate 24 can cooperate for use with the dust screen on the driven shafting, which can stop the graphite dust entering into the pressure-bearing casing 3 of the magnetic shaft coupling from the working chamber, so as to keep relatively clean operational environment of the driven magnetic component and its bearings. A shielding ring located inside the pressure-bearing casing 3, along with the thickened step of the closed end, protect the motive member outside the pressure-bearing casing 3 from overdose irradiation of the rays of the fuels elements in the working chamber, meanwhile it can also ensure the safety of maintenance staff.

The ball tracks of the bearings inside the pressure-bearing casing 3 of the above-mentioned drive device for helium space is sprayed with a solid lubricant film, and ceramic balls are adopted to ensure the bearings to obtain good solid lubrication in high temperature environment, and avoid a thermal state adhesion between the balls and the ball tracks which may affect their relative movement properties. The spray of wear-resistant coating or the application of bearings made of wear-resistant alloy can enhance the antifriction and wear-resistant properties, and extend the service life of equipment components. When the magnet shaft coupling uses a push bearing and a radial bearing in pair, the drive device can be flexibly installed at any position in the space.

Preferably, the pressure-bearing casing 3 is made of TC4 titanium alloy. Because of a large specific resistance and a high strength, under the environment subject to the same internal pressure, a wall thickness of a pressure-bearing casing made of titanium alloy can be smaller than that of a carbon steel and a stainless steel, which not only reduces the weight of equipments, but also reduces eddy current loss of the magnetic field due to the wall thickness of the pressure-bearing casing, so that the transmission efficiency is raised.

The pressure-bearing casing 3 is an important component located in the magnetic coupling member for sealing a driven member inside a working container; besides the functions of seal and isolation, it also has the functions of locating, supporting and controlling the directional movement of the driven member for the driving magnetic component 9 and driven magnetic component 10. The selection of TC4 titanium alloy can make a small thickness of wall and reduce eddy current loss, meanwhile keeps the strength and deformation rigidity of the pressure-bearing casing. In order to ensure the reliability of transmission of movement, the driven magnetic component 10 under the condition of high temperature is made of samarium cobalt, a permanent magnetic material of rare earth cobalt, which has high Curie temperature and good magnetic-thermal stability. On the alignment of magnetic circuits of the driving magnetic component 9 and the driven magnetic component 10, the magnetic shaft coupling with a disc-type structure in FIG. 1 can use a tightly aligned magnetic circuit to make the structure compact. However for the cylindrical magnetic shaft coupling 8 in FIG. 2 through FIG. 4 having a large axial length, a magnetic circuit with multiple lines of magnetic concentration can be used to ensure the control precision of synchronous movement between the driving magnetic component and the driven magnetic component. In order to ensure reliability and service life of high temperature operation of the magnetic shaft coupling, the ball tracks thereof supporting a second bearing pair 16 can adopt a solid lubricant coating and ceramic balls coated with wear-resistant coating, to avoid an adhesion during operations under high temperature; For operational working conditions of low speed, the bearings can be made of wear-resistant alloys. A first bearing pair 15 and the second bearing pair 16 supporting the driving magnetic component 9 and driven magnetic component 10 of the pressure-bearing casing 3 in FIG. 4 adopt a cooperation of a pushing bearing and a radial bearing for use, which not only enhances the stability of support, but also enables the transmission device to be installed at any positions.

Figure 2:
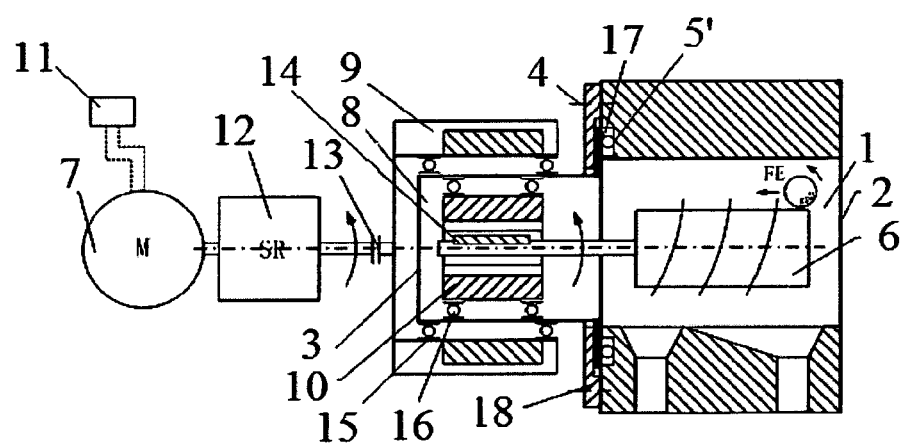
FIG. 2 is a structural schematic view of a drive device for a sealed transmission of a helium space according to an embodiment of the present invention.
Figure 3:
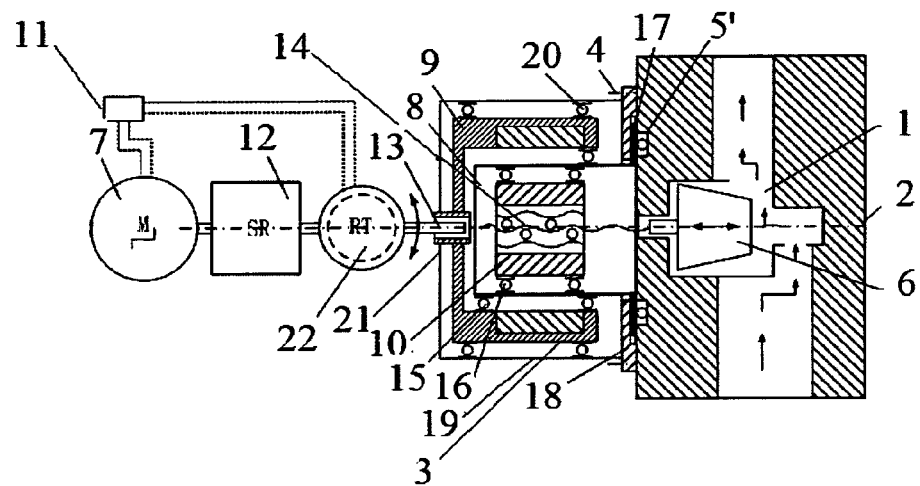
FIG. 3 is a structural schematic view of a drive device for a sealed transmission of a helium space according to another embodiment of the present invention.

The functions such as helium transportation, switching, control, conversion, adjustment, etc. inside a circuit pressure boundary a reactor auxiliary system of a high temperature gas cooled reactor have to be realized by the transmission member of the pressure-bearing mechanical equipment, and the main function of a fuel handling system of a pebble-bed high temperature reactor is the handling and circulation of a spherical fuel element, whose pipeline system is connected to a circuit pressure boundary; besides the above motion functions with respect to the helium, it is necessary to carry out the functions such as sorting, transportation, switching, shunting, turning and quantity control, etc. Therefore, the motion executing member and its motion type in the helium space of a high temperature gas cooled reactor are various, for example, a high speed rotary movement of the main shaft of a compressor impeller as shown in FIG. 1, a low speed rotary movement of the main shaft of a mill ball separator as shown in FIG. 2, a linear feed movement in FIG. 3 and a low speed, synchronous angular movement of a transportation conversion equipment in FIG. 4. The linear movement in FIG. 3 is realized by an organic combination of the transmission of the magnetic shaft coupling with the mechanical transmission of a ball screw, which simplifies the complicated mechanical structure of a pure mechanical transmission, making the operation smooth and reliable.

Figure 4:
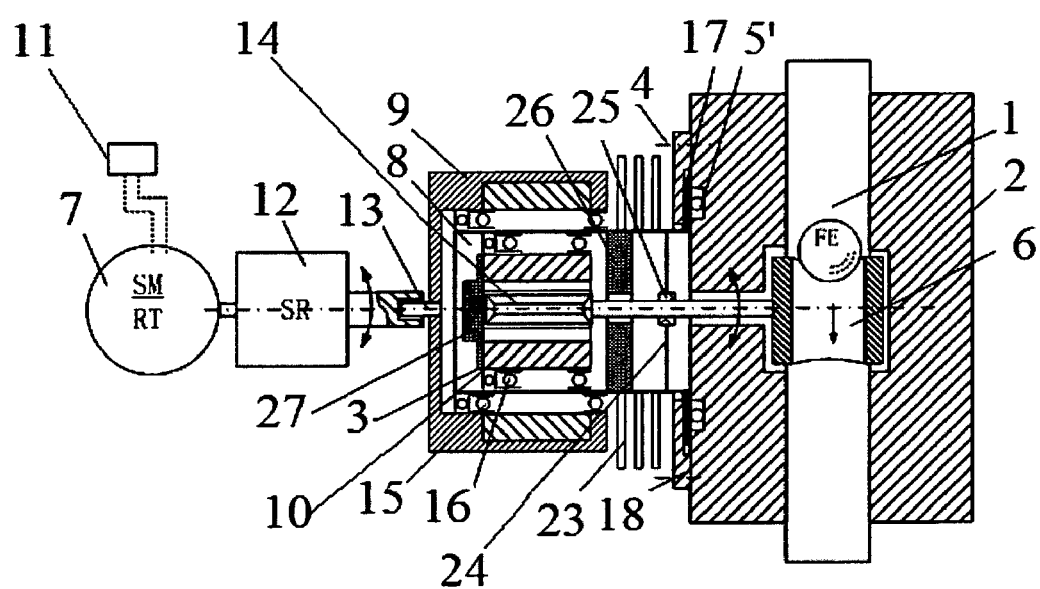
FIG. 4 is a structural schematic view of a drive device for a sealed transmission of a helium space according to still another embodiment of the present invention.

In FIG. 1, a direct connection between a motor and the magnetic shaft coupling is adopted, which can drive the executing member at a high speed. For the conditions in which low speed and change of torque are needed, as shown in FIG. 2 through FIG. 4, on the main shaft of the motive member, a decelerator is provided for use in cooperation. For the drive of a stepping motor in FIG. 3 and the motion system of a servo motor in FIG. 4, in order to realize automatic control of stroke and rotary angle of the executing member, a motion sensor such as a rotary encoder can be additionally located on the main shaft of the motive member. The feedback signals of the rotary encoder can be used to conduct a closed loop control. As the servo motor carries a motion sensor itself, it is not necessary to add another sensor, thus the structure of the transmission device is more compact. An alternating current servo motor which carries a rotary transformer with a high resolution is selected for use in FIG. 4, so that it can precisely control the rotary angle of a movement member in a wider range of motion speed.

Because of the seal function of the pressure-bearing casing 3 of the magnetic shaft coupling 8, a dynamic seal of said helium space is actually converted into a static seal at a position where an end flange 17 of the pressure-bearing casing 3 is jointed with the chamber body 2. In FIG. 1, the sealing is carried out directly by the fastener 4 and the spacer sealing element 5. In order to realize a more reliable seal under thermal state pressure-bearing environment, the sealing element 5 can be replaced by an O-shape metal ring 5', meanwhile a supporting flange 18 is located at the end of the ring 5, as shown in FIG. 2 and FIG. 4, a sleeve flange as shown in FIG. 3 can be used to further act as a supporting member of the component for motive member equipment.

FIG. 4 illustrated a thermal state operational condition of radioactive dust in the working chamber, the heat dissipation, dustproof and shielding structure designs can be conducted depending on the pressure-bearing casing and the driven shaft. Dustproof plate 24 and heat sink 23 are respectively fixed inside and outside the static pressure-bearing casing, to avoid overheat of the support bearing of the magnetic shaft coupling and the external motive member. At the same time, the cooperation of dustproof plate 24 with metal dust screen 25 on the driven shaft can effectively prevent dust from entering into the sleeve, which may increase the movement load. Metal shielding ring 26 fixed on the pressure-bearing casing 3 is cooperated with a shielding step 27 of the driven magnetic component 10, which can avoid a direct overdose irradiation of a fuel sphere FE to the magnetic components and the external motive member.

In the above-mentioned sealed transmission device for helium space and drive device thereof, the driving magnetic component 9 and the driven magnetic component 10 in the magnetic shaft coupling are connected by an absolutely separated soft connection, so that the pressure-bearing casing 3 is used to separate the driving magnetic component and the driven magnetic component in two totally different systems, at the same time, the pressure-bearing casing 3 plays a role of complete seal. When the motive member drives the driving member to rotate, an non-contact power transmission between the driving member and the driven member can be realized through a magnetic torque generated by the pull and push actions of the combined magnetic circuit in the driving and driven members; moreover, by means of the pressure-bearing casing of the magnetic shaft coupling which isolates the thermal-state radioactive helium atmosphere in the casing from the chamber environment outside the casing, a dynamic seal is converted into a static seal, to realize a non-leakage static seal between the driving and driven members. The pressure-bearing casing, the driving magnetic component and the driven magnetic component of the magnetic shaft coupling are all rigid bodies, which solves the problems involved in the sealing of corrugated pipes such as a small rigidity, liable to be instable, unable to reverse at large angles and limited fatigue life, etc., and meets the technical requirements for the operations such as big torque, continuous operation for long time, reciprocating rotation and frequent start and stop, etc. The motive member located outside the pressure-bearing casing, operating under compartment standard environment, can adopt mature products and standard components. The connection between the driving component and the motive member, as well as the connection between the executing member in the driven member and the driven magnetic component are all static connections; furthermore, the separability feature of the magnetic shaft coupling can simplify the complicated mechanical transmission device, and the involved motion equipment components are easy for replacement and maintenance and quick disassembly to ensure the reliability of the whole system. Moreover, as there is no electrical component located inside the pressure-bearing casing, it avoids weak links in the connections which may be involved in the electric connectors, further ensuring the reliability of a sealed drive method and equipment components thereof.

The present invention is not limited to the above-mentioned embodiments, as long as a magnetic shaft coupling is used in the seal transmission for helium space, no matter what kind of driving motor is used by the motive member, whether a decelerator and/or a motion sensor and what kind of decelerator and sensor is used, how the magnetic circuit of the magnetic shaft coupling is arranged, whether the driving magnetic component is in direct connection with the motive member, whether the driven magnetic component and the motion executing member involve guiding, what kind of structure the support bearings use, and whether these bearings are coated, all of which fall into the scope of protection of the present invention

INDUSTRY APPLICABILITY

Since the pressure-bearing casing, the driving magnetic component and the driven magnetic component of the magnetic shaft coupling are all rigid bodies, it solves the problems involved in the sealing of corrugated pipes such as small rigidity, instability, unable to be twisted at large angles, limited fatigue life, etc., and can meet the technical requirements for the operations such as large torque, continuous operation for long time, reciprocating rotation and frequent start and stop, etc. The motive member that is located outside the pressure-bearing casing and operating under compartment standard environment can adopt mature products and standard components. The connection between the driving magnetic component and the driving member, as well as the connection between the executing member in the driven member and the driven magnetic component are all static connections; furthermore, the separability feature of the magnetic shaft coupling can simplify the complicated mechanical transmission device, and the involved motion equipment components are easy for replacement, maintenance and quick disassembly to ensure the reliability of the whole system. Moreover, as there is no electrical component located inside the pressure-bearing casing, it avoids weak links in the connections which may be involved in the electric connectors, further ensuring reliability of the sealed drive method and equipment components thereof.

The invention claimed is:

1. A drive device for a sealed transmission of a helium space having a chamber body, comprising:
   a motive member;
   an executing member;
   a transmission member, the transmission member comprising a magnetic shaft coupling which comprises a pressure-bearing casing, a driving magnetic component located outside the pressure-bearing casing and a driven magnetic component located inside the pressure-bearing casing, the pressure-bearing casing connecting and supporting the driving magnetic component and the driven magnetic component respectively by a first bearing pair and a second bearing pair, and the pressure-bearing casing connected to the chamber body of the helium space;

a heat dissipation structure outside a cylindrical shell of the pressure-bearing casing; and a dustproof plate located inside the cylindrical shell of the pressure-bearing casing, and a metal dust screen located on a driven shaft.

2. The drive device for a sealed transmission of a helium space of claim 1, wherein the magnetic shaft coupling comprises a disc-type structure, and wherein the driving magnetic component and the driven magnetic component each comprise a plane-shaped structure.

3. The drive device for a sealed transmission of a helium space of claim 1, wherein the magnetic shaft coupling is a cylinder-type structure, and the driving magnetic component and the driven magnetic component each comprise a sleeve-shaped magnetic ring structure.

4. The drive device for a sealed transmission of a helium space of claim 1, wherein the pressure-bearing casing has a flange at an opening end, and further comprising a sealing spacer provided between the flange and an end face of the chamber body.

5. The drive device for a sealed transmission of a helium space of claim 1, wherein the pressure-bearing casing has a flange at an opening end, and an O-shape metal ring between the flange and an end face of the chamber body.

6. The drive device for a sealed transmission of a helium space of claim 1, further comprising a plurality of sleeve flanges outside the pressure-bearing casing connected to the chamber body by bolt connection fasteners.

7. The drive device for a sealed transmission of a helium space of claim 6, further comprising a sleeve support outside the pressure-bearing casing, the end face of the sleeve support forming a support for the shafting of the motive member, and the plurality of sleeve flanges connected to the chamber body by a plurality of bolt connection fasteners.

8. The drive device for a sealed transmission of a helium space of claim 1, further comprising a thick-walled metal shielding ring inside an open end of the cylindrical shell of the pressure-bearing casing, and a thickened shielding step at an end of the pressure-bearing casing.

9. The drive device for a sealed transmission of a helium space of claim 1, wherein each of the first bearing pair and the second bearing pair is comprises a wear-resistant alloy.

10. The drive device for a sealed transmission of a helium space of claim 6, wherein each of the first bearing pair and the second bearing pair comprise ball tracks with solid lubricant films deposited by plasma spray and a ball comprising of a ceramic.

11. The drive device for a sealed transmission of a helium space of claim 10, wherein the pressure-bearing casing comprises titanium alloy.

12. A drive device for a sealed transmission of a helium space having a chamber body, comprising:

a motive member;

an executing member;

a transmission member, the transmission member comprising a magnetic shaft coupling which comprises a pressure-bearing casing, a driving magnetic component located outside the pressure-bearing casing and a driven magnetic component located inside the pressure-bearing casing, the pressure-bearing casing connecting and supporting the driving magnetic component and the driven magnetic component respectively by a first bearing pair and a second bearing pair, and the pressure-bearing casing connected to the chamber body of the helium space;

a heat dissipation structure outside a cylindrical shell of the pressure-bearing casing; and a thick-walled metal shielding ring inside an open end of the cylindrical shell of the pressure-bearing casing, and a thickened shielding step at an end of the pressure-bearing casing.

13. The drive device for a sealed transmission of a helium space of claim 12, wherein the magnetic shaft coupling comprises a disc-type structure, and wherein the driving magnetic component and the driven magnetic component each comprise a plane-shaped structure.

14. The drive device for a sealed transmission of a helium space of claim 12, wherein the magnetic shaft coupling is a cylinder-type structure, and the driving magnetic component and the driven magnetic component each comprise a sleeve-shaped magnetic ring structure.

15. The drive device for a sealed transmission of a helium space of claim 12, wherein the pressure-bearing casing has a flange at an opening end, and further comprising a sealing spacer provided between the flange and an end face of the chamber body.

16. The drive device for a sealed transmission of a helium space of claim 12, wherein the pressure-bearing casing has a flange at an opening end, and an O-shape metal ring between the flange and an end face of the chamber body.

17. The drive device for a sealed transmission of a helium space of claim 12, further comprising a plurality of sleeve flanges outside the pressure-bearing casing connected to the chamber body by bolt connection fasteners.

18. The drive device for a sealed transmission of a helium space of claim 17, further comprising a sleeve support outside the pressure-bearing casing, the end face of the sleeve support forming a support for the shafting of the motive member, and the plurality of sleeve flanges connected to the chamber body by a plurality of bolt connection fasteners.

19. The drive device for a sealed transmission of a helium space of claim 12, further comprising a dustproof plate located inside the cylindrical shell of the pressure-bearing casing, and a metal dust screen located on a driven shaft.

20. The drive device for a sealed transmission of a helium space of claim 12, wherein each of the first bearing pair and the second bearing pair comprises a wear-resistant alloy.

21. The drive device for a sealed transmission of a helium space of claim 20, wherein each of the first bearing pair and the second bearing pair comprise ball tracks with solid lubricant films deposited by plasma spray and a ball comprising a ceramic.

22. The drive device for a sealed transmission of a helium space of claim 21, wherein the pressure-bearing casing comprises titanium alloy.

* * * * *